No. 852,786. PATENTED MAY 7, 1907.
W. K. HODGMAN.
PRINTING PLATE HOLDER.
APPLICATION FILED APR. 12, 1906.
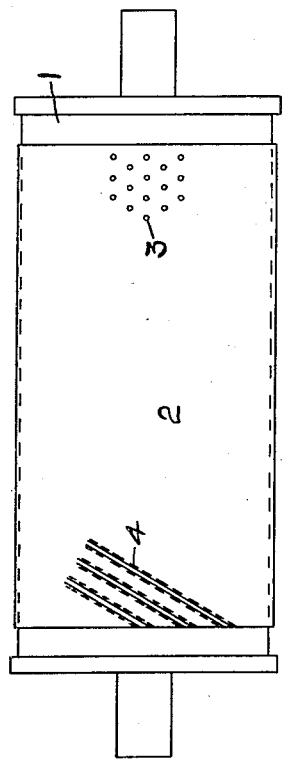
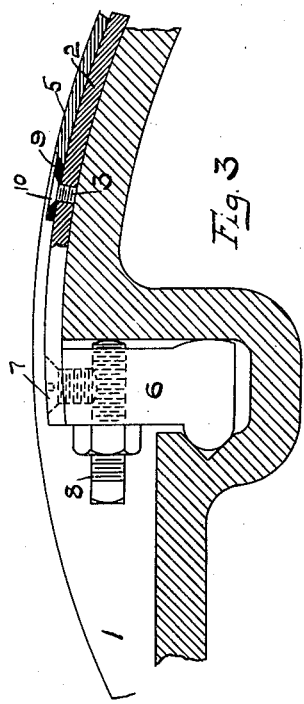
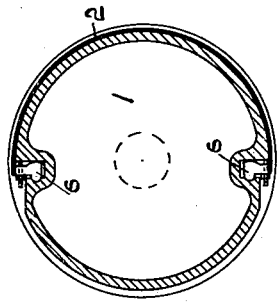
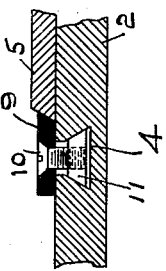
Witnesses
Inventor
William K. Hodgman

UNITED STATES PATENT OFFICE.

WILLIS K. HODGMAN, OF TAUNTON, MASSACHUSETTS, ASSIGNOR TO THE HUBER-HODGMAN PRINTING PRESS COMPANY, OF TAUNTON, MASSACHUSETTS.

PRINTING-PLATE HOLDER.

No. 852,786.     Specification of Letters Patent.     Patented May 7, 1907.

Application filed April 12, 1906. Serial No. 311,321.

*To all whom it may concern:*

Be it known that I, WILLIS K. HODGMAN, a citizen of the United States, residing in Taunton, county of Bristol, and State of Massachusetts, have invented certain new and useful Improvements in Printing-Plate Holders for Rotary Printing-Presses, of which the following is a specification.

My invention relates to an improved holder for stereotype, electrotype, or other printing-plates for rotary printing presses, to be made of flexible metal prepared with threaded orifices or dove-tail grooves while the metal is in the form of a flat sheet.

In rotary printing presses it is the common practice to provide the surface of the printing-cylinder with threaded orifices or dove-tail grooves to receive the screws or catches which are used to fasten the printing-plates to the surface of the printing-cylinder. This method of making the threaded orifices or dove-tail grooves in the surface of the printing-cylinder itself is objectionable because it is expensive on account of the shape and size of the cylinder, and because the orifices or grooves cannot be readily renewed, if required, on account of wear, breakage, or defective material.

The object of my invention is to provide a suitable flexible metal plate holder which can be wrapped around the surface of the printing-cylinder after the threaded orifices or dove-tail grooves are made in the holder, and means to fasten it to the printing-cylinder.

With this object in view, my invention consists in a printing-cylinder, a flexible metal printing plate holder provided with threaded orifices or dove-tail grooves to receive the screws or catches which are used to fasten the printing-plates to it, and means to fasten it to the printing-cylinder. Such being the general nature of my invention, in order to make the same more clearly understood, I have shown in the accompanying drawings means for carrying the same into practical effect without limiting my invention in its useful application to the particular construction which, for the sake of illustration, I have delineated.

In the drawings, similar numbers refer to similar parts throughout the several views.

Figure 1 is a side elevation of a printing-cylinder equipped with a flexible metal printing-plate holder. Fig. 2 is a cross section of same. Fig. 3 an enlarged broken cross section of the same showing in detail means for fastening the plate holder to the printing-cylinder. Fig. 4 an enlarged broken sectional view of the plate holder with dove-tail grooves.

Referring to the drawings, 1 indicates a printing-cylinder for a rotary printing-press, and about its printing surface is wrapped the flexible metal plate holder 2, provided with threaded orifices 3, or dove-tail grooves 4, to receive the screws or catches which are used to fasten the printing-plate 5 to it. The plate holder 2 is securely fastened to the printing-cylinder and drawn tightly around its surface by means of the levers 6, which are provided with fastening screws 7, and tightening bolts 8, plainly shown in Fig. 3.

In Fig. 1 I have shown the plate holder 2 with a few of both the threaded orifices 3 and dove-tail grooves 4, but it is to be understood that in practice the whole of that part of the plate holder covering the printing surface of the printing-cylinder would be provided with either the threaded orifices or dove-tail grooves.

In Fig. 3 I have shown a common form of catch or clamp 9, which by means of the screw 10 and threaded orifice 3 fastens the printing-plate 5 to the plate holder 2, and in Fig. 4 I have shown a common form of catch or clamp 9, which by means of the screw 10, and the nut 11, in the dove-tail groove 4, fastens the printing-plate 5 to the plate holder 2.

In the practice of my invention I take a flat plate of flexible metal and drill a large number of holes or recesses therein, preferably so as to cover the whole surface thereof, to provide for the application thereto of plates of non-predetermined sizes, or I form grooves in such flat plate. I have discovered that if sockets, grooves or holes be provided in a flat, flexible plate and the same be afterward wrapped about a printing cylinder, such sockets, grooves or holes will not be distorted to such an extent as to prevent the intended use of a plate when in such position.

It will now be understood that I have shown and described a flexible metal printing-plate holder which can be economically manufactured when in the form of a flat sheet, and which can be readily fastened to a printing-cylinder and readily removed to be cleaned or renewed.

What I claim as new and desire to secure by Letters Patent is:—

1. A rotary printing press cylinder adapted for use with stereotype, electrotype or other printing plates, a flexible metal printing plate holder adapted to be wrapped about the printing cylinder and to have secured upon its surface after such plate holder has been positioned upon the printing cylinder a stereotype, electrotype or other printing plate of non-predetermined size, means to tighten said plate holder about the cylinder while positioned thereon and provisions upon the upper face of said plate holder whereby such plate may be secured thereto.

2. A rotary printing press cylinder adapted for use with stereotype, electrotype or other printing plates, and means to tighten said plate holder about the cylinder while positioned thereon a flexible metal printing plate holder having a continuous plate receiving upper surface co-extensive with that of the plate to be applied thereto, the same being adapted to be wrapped about the printing cylinder and to have secured upon said surface after such plate holder has been positioned upon the printing cylinder a stereotype, electrotype or other printing plate.

3. A rotary printing press cylinder adapted for use with stereotype, electrotype or other printing plates, a flexible metal printing plate holder having a continuous plate receiving upper surface co-extensive with that of the stereotype, electrotype or other printing plate to be secured thereto, means to tighten the plate holder about the printing cylinder while positioned thereon, and provisions upon the upper face of said plate holder whereby a plate of non-predetermined size may be secured thereto after such plate-holder has been positioned upon the printing cylinder.

4. A rotary printing press cylinder adapted for use with stereotype, electrotype or other printing plates, a flexible metal printing plate holder having a continuous plate receiving upper surface co-extensive with that of the stereotype, electrotype or other printing plate to be secured thereto, the whole of that part of the plate holder covering the printing surface of the cylinder being provided with securing recesses in the upper face thereof, whereby plates of non-predetermined size may be secured thereto after such plate holder has been positioned upon the printing cylinder, and means to tighten the plate holder about the printing cylinder while positioned thereon.

5. A rotary printing press cylinder adapted for use with stereotype, electrotype or other printing plates, a flexible metal printing plate holder adapted to be wrapped about the printing cylinder, and having the upper face thereof substantially covered with closely spaced securing recesses adapted to receive therein locking means for securing the said plate to the holder at a large number of points whereby such plate may be secured to the surface of the plate holder after the plate holder has been positioned upon the printing cylinder, and means to tighten the plate holder about the cylinder while positioned thereon.

6. A rotary printing press cylinder adapted for use with stereotype, electrotype or other printing plates, a flexible metal printing plate holder adapted to be wrapped about the printing cylinder, and to have applied to the upper surface thereof printing plates of non-predetermined size, the upper surface of the said plate holder being provided with a large number of securing recesses adapted to receive locking means for securing a plate therein at a number of variable points, whereby such plate may be secured to the plate holder after such plate holder has been positioned upon the printing cylinder and means to tighten the plate-holder about the cylinder while positioned thereon.

7. A rotary printing press cylinder adapted for use with stereotype, electrotype or other printing plates, a flexible metal printing plate holder adapted to be wrapped about the said cylinder and having a continuous plate receiving upper surface to receive plates of non-predetermined or varying size, and provisions upon the said upper surface of said plate holder for securing a plate thereto at a plurality of points adapted to be varied according to the non-predetermined size of the plate, whereby such plate may be secured to the plate holder after such plate holder has been positioned upon the printing cylinder and means to tighten the plate holder about the cylinder while positioned thereon.

In testimony whereof I have hereunto set my hand, in the presence of two subscribing witnesses.

WILLIS K. HODGMAN.

Witnesses:
BICKNELL HALL,
NOBLE W. ASHLEY.